Figure 1:
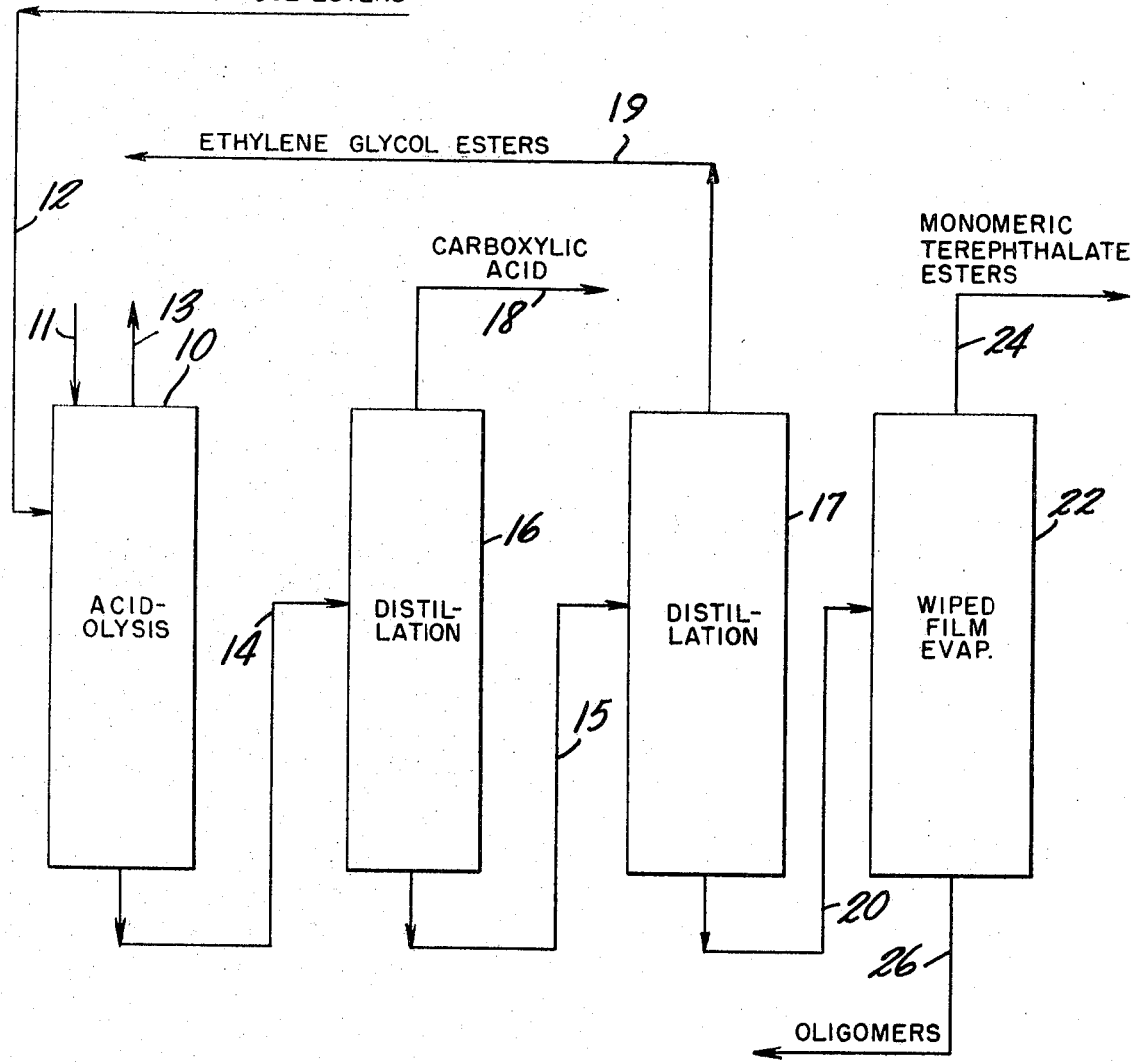

[19] United States Patent
Winnick et al.

[11] 3,855,275
[45] Dec. 17, 1974

[54] TREATMENT OF TEREPHTHALIC ACID REACTION

[75] Inventors: Charles N. Winnick, Teaneck; Judd Posner, Hackensack, both of N.J.

[73] Assignee: Halcon International, Inc., New York, N.Y.

[22] Filed: Apr. 30, 1971

[21] Appl. No.: 139,083

[52] U.S. Cl....... 260/475 PR, 260/75 M, 260/475 P
[51] Int. Cl............................................. C07c 69/82
[58] Field of Search................... 260/475 B, 475 PR

[56] References Cited
UNITED STATES PATENTS

| | | | |
|---|---|---|---|
| 2,856,375 | 10/1958 | Mikesa............................... | 260/475 |
| 3,395,419 | 8/1968 | Nunlist et al. ..................... | 15/246.5 |
| 3,487,100 | 12/1969 | Arai et al....................... | 260/475 PR |
| 3,576,842 | 4/1971 | Kimura et al. .................. | 260/475 B |
| 3,597,470 | 8/1971 | Witt et al...................... | 260/475 PR |

FOREIGN PATENTS OR APPLICATIONS

| | | | |
|---|---|---|---|
| 44-20455 | 9/1969 | Japan............................ | 260/475 PR |
| 978,172 | 12/1964 | Great Britain ................... | 260/475 B |
| 1,032,730 | 6/1966 | Great Britain ................... | 260/475 B |
| 765,853 | 8/1967 | Canada ........................... | 260/475 B |
| 744,421 | 2/1956 | Great Britain .................. | 260/475 B |
| 955,516 | 4/1964 | Great Britain .............. | 260/475 B |

OTHER PUBLICATIONS

Groggins, Unit Processes in Org. Chem., p. 620 (1952).

Primary Examiner—James A. Patten
Assistant Examiner—E. Jane Skelly
Attorney, Agent, or Firm—William C. Long; David Dick; Riggs T. Stewart

[57] ABSTRACT

Precursors for polyesters suitable for fiber and film formation are produced from a reaction product mixture comprising lower carboxylate esters of (hydroxyethyl) terephthalates prepared in a reaction zone, as by reacting terephthalic acid with lower carboxylate esters of ethylene glycol. A product comprising the lower carboxylate esters (of (hydroxyethyl) terephthalates is separated from the reaction mixture after its removal from the reaction zone by volatilizing more volatile materials and volatilizing the lower carboxylate esters of the (hydroxyethyl) terephthalates away from less volatile materials, with the terephthalate esters being treated with a reducing agent in the reaction zone or with an oxidizing agent and/or a reducing agent, after removal of the product mixture from the reaction zone.

12 Claims, 2 Drawing Figures

TREATMENT OF TEREPHTHALIC ACID REACTION

This invention relates to the preparation of polyester precursors and is more particularly concerned with the production of precursors which can be converted to polyesters suitable for the formation of fibers and films. More specifically, the invention relates to a process which is effective for the preparation of fiber-grade polyester precursors from carboxylate diesters of bis-(hydroxyethyl) terephthalate, (more specifically bis-(beta-hydroxethyl) terephthalate), i.e. bis-(beta-acyloxyethyl) terephthalates, and mixtures of such esters with carboxylate monoesters of mono-(hydroxyethyl) terephthalate, i.e. mono-(beta-acyloxyethyl) terephthalates, especially when produced from commercial-grade terephthalic acid, such as that obtained by the oxidation of para-xylene and other para-dialkylbenzenes.

It is known that para-xylene as well as para-dialkylbenzenes wherein the alkyl groups contain more than one carbon atom, e.g. para-diethylbenzene, para-dipropyl benzene, and the like, can be converted to terephthalic acid, for example by means of nitric acid oxidation of the alkyl groups or by the so-called liquid-phase air oxidation process. Typical commercial processes for employing the air oxidation technique involve the use of halogen activation of a metal to catalyze the oxidation of the alkyl groups on the benzene ring. Air is commonly used, although oxygen or other molecular oxygen-containing gas can be employed. Such processes are attractive commercially, but the terephthalic acid prepared by them inherently contains numerous impurities. Attempts at removing these impurities from the terephthalic acid have had varying success, primarily because terephthalic acid is extremely insoluble both in water and in the common organic solvents. Such impurities comprise a variety of different by-products of the oxidation process and cannot be tolerated in the amounts produced when the terephthalic acid is to be used for the preparation of polyesters intended to be formed into fibers and films, since the impurities tend to form color bodies, to reduce the stability of the polyester, and otherwise to affect adversely various properties which are desirable in polyester fibers and films. These impurities consist for the most part of organic compounds having functional groups, e.g. compounds having aldehydic and ketonic structures, and it is believed that they include 4-carboxy benzaldehyde, benzil, fluorenone, and their derivatives, as well as various unidentified organic compounds which act to discolor and to affect adversely the properties of polyesters derived from the terephthalic acid in which they are present.

This problem is of serious commercial and economic interest and no little effort has been expended in attempts at its solution. However, because of the characteristic insolubility of terephthalic acid, purification methods which have been found to be even reasonably effective are relatively complicated and expensive, or suffer from some other disadvantages. Such prior processes have, for example, involved a solvent extraction with special solvents or combinations of solvents as disclosed, for example, in Lese et al. U.S. Pat. No. 3,448,146; or they have required the conversion of the terephthalic acid into its alkali metal or ammonium salts and have necessitated the subsequent regeneration of the terephthalic acid for later conversion to a polyester precursor, such as described in Meyer U.S. Pat. No. 3,420,879; or they have involved a circuitous procedure wherein the terephthalic acid is converted to dimethyl terephthalate to facilitate purification, with the necessity of later subjecting the dimethyl terephthalate to a difficult ester interchange reaction, as disclosed in Siggel U.S. Pat. No. 2,894,021. Another approach to the problem has been the attempted modification of the basic dialkylbenzene oxidation process itself including, for example, a post-heating step but, while apparently there is some reduction in impurities achieved in this way, it is acknowledged in Katzschman U.S. Pat. No. 3,543,193 that it if it desired to prepared polyester fibers from the terephthalic acids thus produced, it is necessary to subject the terephthalic acid to additional purification.

It is apparent, therefore, that the problem of deleterious impurities associated with terephthalic acid is a continuing one and that there is a pressing need for a process for preparing polyester precursors which can be converted to polyesters for fiber and film formation which does not require the pre-purification of the terephthalic acid used in the formation of the precursors, nor the synthesis of special extraneous terephthalic derivatives, such as dimethyl terephthalate, which are not actually necessary for producing the precursor but are resorted to in order to place the terephthalic acid in the form in which some reasonable purification of it can be achieved.

It is an object of this invention to meet this need by providing a system for preparing polyester precursors of the character indicated from impure terephthalic acid which does not require the pre-purification of the terephthalic acid or the formation of extraneous terephthalic acid derivatives.

It is another object of the invention to provide a process for producing such polyester precursors which is an integral part of a direct route to the production of the precursors.

It is a further object of the invention to provide an integrated series of steps for producing fiber-grade polyester precursors, such as lower carboxylate esters of bis(hydroxyethyl) terephthalate.

It is still a further object of this invention to provide a method of the character indicated which yields directly polyester precursors which can be converted to polyesters suitable for the formation of fibers and films.

Other objects will be apparent from the following detailed description of the invention and of illustrative embodiments thereof.

It has been found that the foregoing objects can be realized by a process which comprises the oxidative and/or reductive treatment of carboxylate esters of (hydroxyethyl) terephthalates which contain the various impurities normally associated with terephthalic acid produced by the oxidation of appropriate organic compounds, such as para-xylene and other para-dialkylbenzenes, and which are suitably prepared by reacting such terephthalic acid with lower carboxylate ester of ethylene glycol in the liquid phase, to produce a reaction mixture containing the (hydroxyethyl) terephthalate carboxylate esters, the reaction mixture being distilled to remove at least some of its more volatile components and to separate the (hydroxyethyl) terephthalate carboxylate esters from less volatile materials, the oxidative and/or reductive treatment being effected by treating the terephthalate carboxylate esters preferably prior to a final distillation step, with an oxidizing agent or a reducing agent, or both.

It has been found that the product of this process has been purified with respect to the deleterious impurities which were present in the impure terephthalic acid and the difficulties of directly purifying the terephthalic acid are effectively avoided. The environment provided by this process is such that the insolubility characteristics of terephthalic acid are not a hindrance and the special treatments of terephthalic acid to prepare it for use in previously proposed impurity removal operations are completely unnecessary. The process provides a smooth, at all times forwardly progressing, route for the production of fiber-grade polyester precursors from impure terephthalic acid.

While the process of this invention can be applied to reaction products of terephthalic acid of varying purity, its obvious major value lies in its suitability for effective use with terephthalic acid which contains the impurities normally associated with this acid as produced by the oxidation of para-dialkylbenzenes and which are apparently responsible for the adverse effect upon color and other properties of polyesters made from it. Thus, the invention is not limited to use with any specific impure terephthalic acid but, as a general rule, terephthalic acid normally produced in commerce contains impurities of the type mentioned in amounts ranging up to about 3 wt. percent and in the usual case, at least about 1.5 wt. percent of such impurities are present. As previously indicated, one identifiable impurity which is present in terephthalic acid produced by the oxidation of para-dialkylbenzenes is 4-carboxy benzaldehyde, commonly referred to as 4-CBA, but there are also apparently involved other carbonyl compounds such as benzil, and fluorenone, and their derivatives, as well as minor quantities of unidentified color bodies or color-producing bodies which, as mentioned, not only discolor the polyester derived from the terephthalic acid containing them, but also have a degrading effect on the polyester with respect to other properties. As a result of the reaction between terephthalic acid and the glycol esters at least some of the organic impurities of the character indicated, particularly the 4-carboxy benzaldehyde, becomes esterified so that the impurities in the materials which are subjected to reduction and/or oxidation in accordance with the invention can be characterized not only as the carbonyl compounds and unidentified color-producing bodies but esterified derivatives of at least some of such impurities, particularly the ester derivatives of 4-carboxy benzaldehyde. While, therefore, the impurities taken as a whole are a mixture predominating in 4-carboxy benzaldehyde and/or its ester derivatives, e.g. its hydroxy esters, it is convenient to express the impurities as a group as 4-CBA. Accordingly, in the disclosure below the content of impurities will be expressed as a 4-CBA content, which facilitates correlation with standard polyester specifications.

The lower carboxylate di-esters of ethylene glycol can be employed as ester reactants but mixtures of such di-esters with the corresponding ethylene glycol monoesters, e.g. mixtures of ethylene glycol diacetate and ethylene glycol monoacetate are highly effective and provide a particularly smooth reaction. Such reactants are known compounds which can be formed in various ways, as by the esterification of ethylene glycol or ethylene oxide with a lower fatty acid having from one to four carbon atoms, e.g. formic acid, propionic acid, and butyric acid. These ester reactants can also be produced by the reaction of ethylene and the appropriate carboxylic acid, e.g. acetic acid, as descibed for example in Belgian Pat, No. 738,104. The dicarboxylate esters of ethylene glycol as commercially produced frequently contain some monoester and, in some cases, contain small amounts of ethylene glycol. In the practice of this invention such commercially-produced dicarboxylic esters of ethylene glycol can be used. Indeed, mixtures of mono- and di-esters containing up to 50 mol percent of the monoesters are very suitably used, and even up to 80 mol percent are effectively employed, and a particularly useful mixture contains 10–30 mol percent of the monoester. In general, when mixtures are employed at least about 3 mol percent of the monoester is used. The ethylene glycol which may be present is ordinarily not objectionable but generally amounts greater than 25 mol percent are not desirable for economic reasons. When the di-ester of ethylene glycol reacts with the terephthalic acid, carboxylic acid is co-produced and the effectiveness and suitability of such ester mixtures is related to the postulated reaction: monoester + carboxylic acid ⇌ di-ester + $H_2O$. Water will, therefore, be produced as a product in proportion to the monoester which reacts but it is readily removed along with the liberated carboxylic acid. Thus, the term "carboxylate esters of ethylene glycol" is used herein to designate not only the di-esters alone but also the di-esters in admixture with the corresponding monoesters.

The reaction between the terephthalic acid and the lower carboxylate esters of ethylene glycol in the liquid phase, which is an acidolysis reaction, is most suitably carried out at reaction temperatures between 100°C and 350°C, preferably 225°C to 300°C. When reaction temperatures are below 220°C, lower reaction rates are observed and from a commercial standpoint, it is advantageous to employ an acidic catalysts. When reaction temperatures of 220°C and above are used, however, there is sufficient thermal activation to provide attractive reaction rates and a catalyst is not necessary but such catalysts can be used, if desired, at any temperature within the specified range. When catalysts are employed, either Bronsted or Lewis acids are particularly suitable. Illustrative of Bronsted acids are sulfuric acid, phosphoric acid, methanesulfonic acid, fluosulfonic acid, dihydroxyfluoboric acid, hydrochloric acid, toleunesulfonic acid, sulfonic-acid containing cation exchange resins, and the like. Illustrative Lewis acids are boron trifluoride, aluminum trichloride, antimony pentafluoride, zinc chloride, and the like. Such acids are well-known types and additional examples can be found, for example, in "Physical Organic Chemistry" by Jack Hine (1962 — McGraw Hill Company, New York) and in "Friedel-Crafts and Related Reactions" by George A. Olah, vol. 1 (1963 — Interscience Publishers, New York). The volatile acids are considerably less desirable in the present system since these acids, although catalyzing the reaction, tend to distill overhead with the lower carboxylic acid, causing separation problems. When a catalyst is used, its concentration can be varied over a wide range. Generally, concentrations by weight based on the total reaction mixture of 0.001 to 20 percent are illustrative, with concentrations of 0.01 to 5 percent being preferred, and concentrations of 0.1 to 2 percent most advantageously employed in most cases.

The lower carboxylate di-esters of bis(hydroxyethyl) terephthalate have the following structural formula:

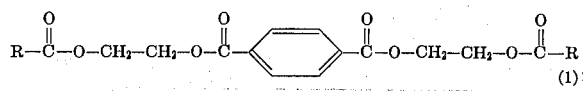

wherein R is hydrogen on an alkyl group having one to three carbon atoms. In the reaction between terephthalic acid and glycol carboxylate esters, there is also produced in significant quantities the carboxylate monoester of mono (hydroxyethyl) terephthalate (mono-(beta-acyloxyethyl) terephthalate:

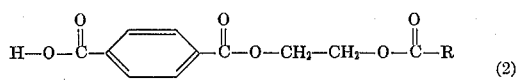

By way of illustration, the reaction described primarily takes place according to the following overall general equation:

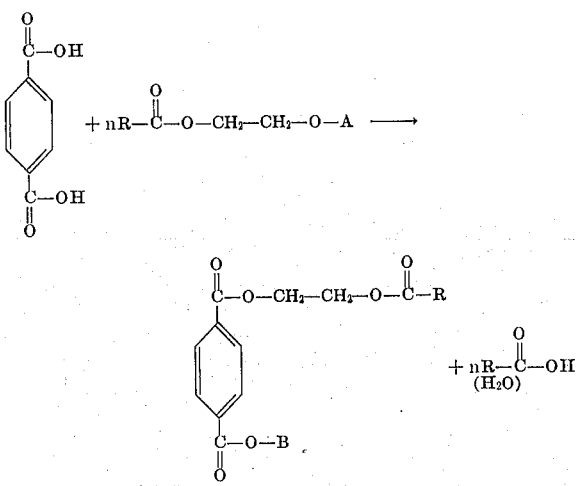

where R has the meaning specified above and wherein A is H or

B is H or

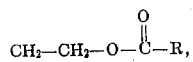

and $n$ is 1–2. When the co-produced carboxylic acid which is released is removed from the reaction zone during the course of the reaction, the product terephthalate ester tends to be predominantly the bis (hydroxyethyl) terephthalate carboxylate diester.

The lower carboxylate monoester of bis(hydroxyethyl) terephthalate

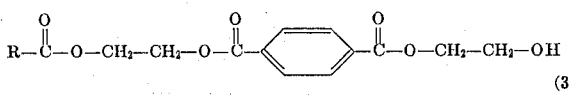

is also generally formed in minor quantities, as are the non-carboxylated derivatives:

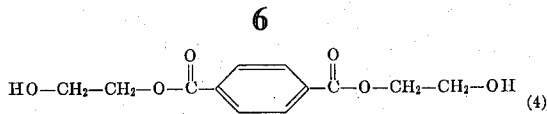

and 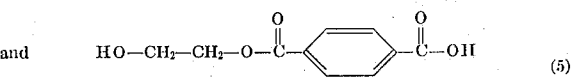

Examination of the foregoing chemical formulae and equations would lead one skilled in the art to expect that removal of the co-product lower carboxylic acid would be necessary to achieve satisfactory conversions (conversion meaning mols of terephthalate ester products formed per mol of terephthalic acid fed). However, it has been found that such acid removal is not necessary. Of course, it is necessary at some stage to remove the acid co-product in order to recover concentrated carboxylate ester product but this can readily be done after completion of the reaction as well as during the reaction. Any co-product water which may be formed will ordinarily be removed along with the acid. Nonetheless, it should be pointed out that co-product acid removal during the reaction favors increased conversion to the dicarboxylate ester of bis-(hydroxyethyl) terephthalate and may also enhance reaction rate, but these are factors more important to economic optimization of the reaction than ones affecting process operation. When economics indicate that removal of co-product lower carboxylic acid during reaction is advantageous, this is most desirably accomplished by carrying out the reaction under conditions whereby formed lower carboxylic acid is vaporized and removed from the reaction zone as a vapor, leaving behind a reaction mixture containing mainly the di-ester of bis-(hydroxyethyl) terephthalate. Conversely, lower carboxylic acid, e.g. acetic acid, may be added to the reaction mixture in varying quantites, e.g. up to a molar quantity equal to 10 times the molar quantity of ethylene glycol esters fed to the system, and when carboxylic acid is added, molar quantities of one to eight times the ester feed are preferably used. In this manner increased amounts of the mono-carboxylate ester of mono-(hydroxyethyl) terephthalate are formed.

The reaction is of the multi-phase type and, in view of the very limited solubility of terephthalic acid, this reactant is suitably suspended in finely-divided form in the reaction mixture during the reaction. The use of organic solvents is not preferred although inert organic solvents such as hydrocarbons, e.g. hexane, ethers such as dioxane, sulfones, nitrated arlys, and the like, can be employed. In addition, any of the liquid reactants, including the alkanoic acid, e.g. acetic acid, or any of the products, can serve as solvents or suspending media. Normally, it is preferred merely to suspend the terephthalic acid in finely-divided form in a liquid body comprising the ester of ethylene glycol together with a catalyst, if used, as the reaction system. Either batch or continuous operations can be employed and, of course, during the progress of the reaction, the reaction system will also contain product di-ester of bis-(hydroxyethyl) terephthalate as well as the monoester of mono-(hydroxyethyl) terephthalate and the other co-produced terephthalic acid derivatives, which will solubilize the terephthalic acid and the 4-CBA.

As mentioned, suitable reaction conditions normally involve temperatures ranging from about 100°C to about 350°C. Although temperatures outside this range can be employed, temperatures below 100°C usually result in undesirably low reaction rates while temperatures above about 350°C risk undesirable thermal decomposition. When catalysts are used, the preferred temperature range is 140°C up to about 220°C and the most desirable range is 175°C to 200°C. When catalysts are not employed, temperatures from about 220°C to 350°C can be used with preferred temperatures being from about 225°C to about 300°C and temperatures from about 240°C to about 275°C being especially preferred. The pressure maintained on the reaction mixture is sufficient to maintain a liquid reaction mixture phase. When co-product lower carboxylic acid is to be removed during the course of the reaction, the pressure is so regulated as to permit stripping off of lower aliphatic carboxylic acid co-product (e.g. acetic acid when ethylene glycol di-acetate is employed as reactant) as the reaction proceeds thereby enhancing the reaction rate and further increasing conversions while still maintaining the liquid reaction phase. Any co-product water which may be formed will ordinarily be removed along with the acid. Illustrative pressures range from about 5 to 500 psia with pressures close to atmospheric, e.g. 14–50 psia, being substantially preferred. To facilitate such acid removal, it is frequently advantageous to employ an inert gas such as nitrogen, carbon dioxide, lower saturated hydrocarbon, or the like, or hydrogen, to strip out the co-product lower aliphatic acid during the reaction.

The reaction times are, of course, a function of temperature and, when a catalyst is used, its type and concentration. Additionally, whenever co-product is removed, its rate of removal also affects reaction times. Reaction times can readily be determined by routine experimentation for any desired conversion. Illustrative reaction times range from about 10 minutes to about 24 hours with desirable times of 0.5 to 10 hours being most usually employed. In carrying out the reaction, it is generally advisable to employ a molar excess of the lower dicarboxylate esters of ethylene glycol and, in any event, mol ratios of the glycol esters to terephthalic acid of at least 2/1 should be employed.

The upper limit of the ratio of reactants depends merely upon practical considerations, with no significant benefits being achieved using ratios of the glycol esters to terephthalic acid in excess of about 30/1 although such higher ratios are quite operative. The desirable mol ratio is 2.5 to 20 mols of glycol ester per mol of terephthalic acid with the most preferred range of reactants being 3 to 15 mols of glycol esters per mol of terephthalic acid. As a result of this reaction, the product will, as mentioned, comprise not only the dicarboxylate ester of bis-(hydroxyethyl) terephthalate, but significant amounts of monoesters of mono-(hydroxyethyl) terepthalate as well. For example, the acidolysis reaction mixture, while generally composed primarily of the di-carboxylate esters of bis-(hydroxyethyl) terephthalate, may contain up to about 70 mol percent of lower carboxylate monoester of mono-(hydroxyethyl) terephthalate, based upon the combined lower carboxylate monoester of mono-(hydroxyethyl) terephthalate and di-ester of bis-(hydroxyethyl) terephthalate present, i.e. the di-ester content will be at least about 30 mol percent, and the mixture may contain small amounts of numerous impurities and by-products, in sum up to about 40 mol percent of the total mixture, generally up to about 5 mol percent. Such impurities and by-products include ethylene glycol, ethylene glycol mono-acylate (e.g. the mono-acetate) ethylene glycol diacylate (e.g. the diacetate), terephthalic acid, mono-(beta-hydroxyethyl) terephthalate, bis-(beta-hydroxyethyl) terephthalate, and bis-(beta-hydroxyethyl) terephthalate-monoacylate.

As previously mentioned, oligomers are normally formed along with the monomeric terephthalate esters in the foregoing reaction. These oligomers can be represented by the formula:

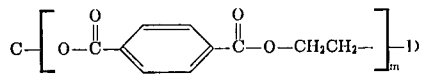

wherein C is H, HO—CH$_2$—CH$_2$, or

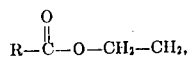

and wherein D is OH,

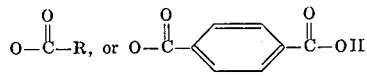

and R is as above indicated and $m$ is an integer having an average value of 2 to 10. In general, the higher the ratio of glycol ester to terephthalic acid, the smaller will be the amount of oligomer formed and the lower will be the average value of $m$ in the above structural formula of the oligomer, i.e. the lower will be the average molecular weight of the oligomers. Conversely, lower ratios of glycol ester to terephthalic acid lead to greater amounts of oligomers and to oligomers of higher average molecular weight. For example, when glycol diacetate is reacted with terephthalic acid at about 250°C in a mol ratio of 20:1, the reaction product contains about 5 percent by weight of oligomers of low molecular weight, whereas when the ratio is lowered to about 5:1, the amount of oligomers formed rises to about 25 weight percent and the average molecular weight of the oligomers also rises.

The reaction product issuing from the reaction zone, i.e. the acidolysis zone, is then suitably treated by distillation and/or evaporation to separate lower boiling materials from the lower carboxylate esters of the (hydroxyethyl) terephthalates and, in turn, to separate the latter from less volatile polymeric materials, e.g. oligomers, and from any non-volatile metallic substances which may have accumulated during the preparation of the raw materials or in the acidolysis reaction. For this purpose, any convenient distillation and/or evaporation apparatus may be employed, but it has been found that particularly good, reproducible results can be obtained if the preliminary distillation to remove lower boiling materials, principally liberated carboxylic acid, which would be acetic acid in the case of a reaction between terephthalic acid and ethylene glycol diacetate, and unreacted ethylene glycol esters, is carried out by a two or three stage flash distillation in a series of stills or, if the mixture is subjected to fractional distillation, in a fractionating column. In this step the residual product largely comprises the carboxylate esters of (beta-hydroxyethyl) terephthalates, oligomers and other polymeric forms of the esters, and non-volatile materials, if any. In the second separating step to recover the product terephthalates, particularly good results can be obtained if the separation is effected by means of a so-called wiped film evaporator, a well-known evaporating apparatus. Any of the wide variety of wiped film devices available commercially can be used, such as those associated with the names Rodney-Hunt, Luwa, Kontro Film, Pfaudler, or Buffalovac.

While the material separated by vaporization from the polymeric residue has been referred to above as the (hydroxyethyl) terephthalate lower carboxylate esters, e.g. esters of mono- and bis-(hydroxyethyl) terephthalate, produced in the acidolysis reaction, it is possible, before the separation is effected, to treat the terephthalates chemically to convert them to some other form, for example the lower carboxylate di-ester of bis-(hydroxyethyl) terephthalate and the lower carboxylate mono-ester of mono-(hydroxyethyl) terephthalate may be hydrolyzed with water to form the corresponding (hydroxyethyl) terephthalates. Thus, the terephthalate product which, as previously mentioned comprises a mixture of carboxylate esters of (hydroxyethyl) terephthalates, can be partially hydrolyzed, e.g. to remove from 25 to 100 percent of the acyl moieties. This is advantageously effected by heating one mol of product with water in the amount of 5 mols to 40 mols at temperatures of 80°C to 250°C for a sufficient period of time to bring about the desired degree of hydrolysis. The hydrolysis reaction can be terminated by rapidly cooling the hydrolysis mixture, e.g. to 50°C. The liberated carboxylic acid and any excess water present are readily removed by simple distillation. This is a less desirable modification of the process, since the terephthalate in the form of its carboxylate esters is more easily separated from the polymeric material. In any case, it is intended that the present invention include this modification.

The term "fiber-grade" as used herein indicates a precursor which can be converted directly or indirectly into a polyester adapated to be shaped into fibers or films of commercially-acceptable quality. A convenient numerical characterization of a fiber-grade polyester precursor is its content of carbonyl compounds, expressed as 4-CBA. Polyester intended for formation into transparent film or colorless fiber requires a greater freedom from color bodies or color producing bodies than polyester intended, for example, for the formation of tire cord. In the former case, a fiber-grade polyester precursor can be characterized as having a 4-CBA content of at most about 25 parts per million, based on the terephthalic acid units in the precursor, whereas for other purposes the precursor may have a somewhat higher 4-CBA content and a convenient maximum is about 500 parts per million on the same basis. It is a feature of the process of this invention that there can be produced precursors which can be converted to polyesters of such commercially-acceptable quality.

In accordance with the present invention, it has been discovered that lower carboxylate esters of (hydroxyethyl) terephthalate, for example as produced by the reaction between terephthalic acid and ethylene glycol lower carboxylate esters, e.g. in an acidolysis reaction of the character described above and containing amounts of 4-CBA and/or its derivatives such as produced by the reaction of 4-CBA with glycol carboxylate esters, and like color-forming contaminates normally associated with terephthalic acid produced by oxidation reactions, can be readily rendered suitable as precursors for polyesters adapted for the making of commercially-acceptable fibers and films by subjecting terephthalate esters to a reducing environment, or to an oxidizing environment, or both. More particularly, in accordance with the present invention, the preparation and recovery of the product of reaction between terephthalic acid and ethylene glycol lower carboxylate esters are integrated with treatments in which the reaction product is subjected to a reducing environment, or to an oxidizing environment, or both, at a point or points in the forward progression of the reaction from the bringing together of the reactants to the eventual recovery of a product comprising a mixture of lower carboxylate esters of (hydroxyethyl) terephthalates which are convertible to fiber-grade polyesters.

The reducing environment is most suitably provided by molecular hydrogen, although the invention is not limited to the use of hydrogen, and other reducing agents can be employed. The advantage of the use of molecular hydrogen is that this reducing agent may be effectively employed either in the initial reaction zone wherein the reaction between the terephthalic acid and the glycol carboxylate ester is effected, i.e. the acidolysis zone; or it may be applied to the reaction product mixture after it has been removed from the acidolysis zone. When hydrogen is used as the reducing agent, there is also employed a small amount of hydrogenation cataylst, e.g. 0.001 to 20 wt. percent, preferably 0.01 to 1.0 wt. percent, based upon the terephthalic acid in the system. Any catalyst effective to catalyze the reduction of carbonyl groups with hydrogen may be employed, such as metallic nickel, Raney nickel, metallic platinum, metallic palladium, cobalt salts such as $Co(NO_3)_2$, palladium salts such as $Pd(NO_3)_2$ and $PdCl_2$, and the like, and these catalysts may be supported, e.g. on carbon, alumina, or other conventional support. Preferably metallic nickel is employed.

When reduction with molecular hydrogen takes place during the reaction between the terephthalic acid and the ethylene glycol carboxylate ester, i.e. in situ in the acidolysis zone, it is preferred that the latter reaction be carried out at temperatures of 225°C and above, but preferably not above 260°C, so that the reaction will proceed readily by thermal activation and the only catalyst that need be present in the system will be the hydrogenation catalyst. To effect the desired reduction, hydrogen is introduced into the reaction zone to provide a hydrogen partial pressure of 1 to 1,000 psia, preferably 5 to 200 psia, and this hydrogen pressure is maintained throughout the reaction period. Ordinarily, reaction periods of 10 min. to 24 hrs., preferably 0.5 hr. to 10 hrs., are satisfactory, although shorter or longer periods may be employed if desired. As previously indicated, the lower aliphatic carboxylic acid coproduct may be stripped off during the reaction and this presents no problem since the desired hydrogen pressure can still be effectively maintained on the system and the hydrogen can be used as a stripping agent by continuously introducing it below the surface of the liquid reaction medium. It will be understood that combinations of extreme temperatures and pressures with large quantites of catalyst which, all acting together, may tend to favor nuclear hydrogenation of the terephthalic acid should preferably be avoided. This, however, is a matter of routine testing and, in general, higher temperatures should be used with lower pressures and lesser quantites of catalyst, and the greater amounts of catalyst are preferably employed under lower temperature and pressure conditions. While molecular hydrogen is the preferred reducing agent, it is contemplated, as mentioned, that other reducing agents effective to reduce carbonyl groups, such as aldehyde groups, for example alkali metal hydrides and borohydrides, e.g. sodium borohydride, lithium borohydride, lithium aluminum tris-tert-butoxy hydride, and the like can be used instead of molecular hydrogen. Such other reducing agents are suitably added in amounts corresponding to 1 to 500 equivalents, preferably 2 to 20 equivalents, per equivalent of organic impurities expressed as 4-CBA in the system. In the use of such other reducing agents reduction, as in the case of hydrogenation, is suitably carried out at temperatures which favor thermal activation of the reaction, e.g. temperature of 25°C to 200°C. Generally, temperatures up to about 150°C are fully adequate. Furthermore, when such other reducing agents are employed, the reducing environment is applied to the reaction mixture after it leaves the acidolysis zone, i.e. in a separate treatment zone. If desired, reduction with molecular hydrogen can also be effected in such a separate treatment zone. In this case, the hydrogen pressures and the quantity of hydrogenation catalyst are the same as those previously indicated for the in situ hydrogenation in accordance with this invention, but preferably temperatures of 30°C to 220°C are employed and the period of reducing reaction is suitably 15 mins. to 300 mins., preferably 30 to 120 mins. When the lower carboxylate (hydroxyethyl) terephthalate esters to be treated are as they issue from the acidolysis zone, they have mixed with them appreciable amounts of the lower alkanoic acid corresponding to the lower carboxylate ester groups and since reducing agents of the alkali metal hydride and borohydride type mentioned above are sensitive to an acidic environment, the lower alkanoic acid is preferably removed before reduction is effected by means of such agents. Such removal of the alkanoic acid is easily effected by distillation as will be described below. There is no such restriction with respect to reduction with molecular hydrogen, however, and such reduction can be effected in the presence of the alkanoic acid or after the alkanoic acid has been removed.

As indicated above, in accordance with another embodiment of this invention, the lower carboxylate (hydroxyethyl) terephthalate esters, such as the product of reaction of terephthalic acid and ethylene glycol carboxylate esters, are subjected to an oxidizing environment rather than to the reducing environment just discussed. In this embodiment it is not ordinarily feasible to effect the oxidation step in the acidolysis zone itself because of the problem of interfering reactions, and the oxidizing environment is, therefore, suitably applied to the reaction mixture at a point after its removal from the acidolysis zone, as in the case of the second reducing system previously described. The oxidizing environment may be provided by molecular oxygen but preferably non-gaseous oxidizing agents are employed. Any non-gaseous oxidizing agent effective to oxidize carbonyl groups, e.g. aldehyde groups, as exemplified by peroxides, e.g. hydrogen peroxide, and peracids such as performic and peracetic acid, inorganic oxidants such as chromic acid, potassium permanganate, and nitric acid, and like oxidizing agents. Preferably, the oxidizing agent is a peracid, most suitably peracetic acid, since such oxidizing agents are usefully effective under moderate conditions. Oxidation is suitably carried out at temperatures of 0° to 200°C, preferably 40°C to 100°C. the quantity of oxidizing agent which is suitably used is 1 to 500 equivalents, per mol of 4-CBA, with 2 to 20 equivalents being preferably used.

When molecular oxygen is used as the oxidizing agent, a suitable oxidation catalyst is preferably employed and, while any catalyst effective to catalyze the oxidation of a carbonyl group, e.g. an aldehyde group, can be employed, preferred catalysts are the cobalt and manganese salts, e.g. salts with carboxylic acids such as acetic acid and like lower alkanoic acids, or naphthenic acids and the like.

In accordance with a further embodiment of the invention, the terephthalic acid-ethylene glycol carboxylate ester reaction product may be subjected both to an oxidizing environment and to a reducing environment, preferably in that order, the conditions for the oxidation and for the reduction being substantially those discussed above in connection with the individual use of these steps.

As previously mentioned, one of the important advantages of the process of the present invention is that the lower carboxylate (hydroxyethyl) terephthalate ester mixture, such as produced in the reaction between terephthalic acid and ethylene glycol lower carboxylate esters, which mixture is separated, preferably in stages, to produce a final fraction adapted to be converted, suitably after at least partial hydrolysis, into a polyester, can be subjected to the reductive and/or oxidative environment at various points in its forward progression from its initial production to its eventual recovery. In its initial form as a reaction mixture containing free alkanoic acid, unreacted ethylene glycol carboxylate esters and the like, the reaction mixture is relatively fluid at lower temperatures and when solid or liquid reducing or oxidizing agents are employed no difficulty is experienced in achieving a homogeneous reaction mixture. However, as the more volatile components are separated, the mixture becomes less fluid at lower temperatures and it is ordinarily advantageous to add such reducing or oxidizing agents in solution. This is particularly true of the peroxide compounds used as oxidizing agents and with the alkali metal hydrides and borohydrides used as reducing agents. Preferably the peroxides are added in aqueous solution or in solution in an alkanoic acid corresponding to the alkanoic acid in the reaction and the hydrides or borohydrides are preferably added in alcoholic solution, the solvent alcohol being readily removed by distillation. When it is desired to effect the reduction and/or the oxidation at a lower temperature at which the mixture being treated at the particular stage in its progress through the system is not sufficiently fluid to permit the ready formation of a single-phase mixture, additional amounts of solvent may be added to increased fluidity. The amount is not critical and is ordinarily simply that required to achieve the desired fluidity. While the solvents mentioned above may be employed, there may be used other solvents inert to the system, such as alkanols; e.g. ethanol, isopropanol and tert-butanol, hydrocarbons and halohydrocarbons, such as benzene, perchlorethylene, and the like.

As discussed above, it is preferred that the reduction and/or oxidation treatment of the lower carboxylate (hydroxyethyl) terephthalates be effected at as early a stage as possible in the course of their progress from initial production to final separation and, as pointed out, the reduction is preferably effected with molecular hydrogen and the reduction step is preferably carried out in the situ in the acidolysis zone. In like manner, acid susceptible reducing agents such as alkali metal hydrides and borohydrides are used as soon as the mixture undergoing treatment has been treated to remove free carboxylic acid and oxidizing treatments are preferably applied as soon as the product mixture is available outside of the reaction zone in which it is produced. However, subject to the possible use of minor amounts of solvents referred to in the previous paragraph, the reaction mixture is such that it can be subjected to oxidative and/or reductive treatments not only at the points indicated but at subsequent points such as following removal of unreacted glycol esters prior to distillation to separate the product lower carboxylate (hydroxyethyl) terephthalate esters from less volatile material, for example in the wiped film evaporator. Ordinarily, it is preferred that these treatments be effected before this vacuum separation, since this step will serve to remove among the less volatile or non-volatile components of the mixture any metallic contaminates or metallic catalysts which may have been employed in the treating steps and there will be produced terephthalate esters of the desired high quality suitable for eventual conversion to polyesters. It is within the scope of this invention, however, to effect the oxidative and/or reductive treatment of the terephthalate ester-containing mixture even after the separation of the type carried out in the wiped film evaporator. This is of advantage when treating agents are employed which may be adversely affected by metallic contaminates such as the peracids. In this event, it is advantageous to subject the treated mixture to a further distillation, e.g. in a second wiped film evaporator, to remove solvents which may have been employed and to effect a further separation from less volatile materials.

Figure 2:
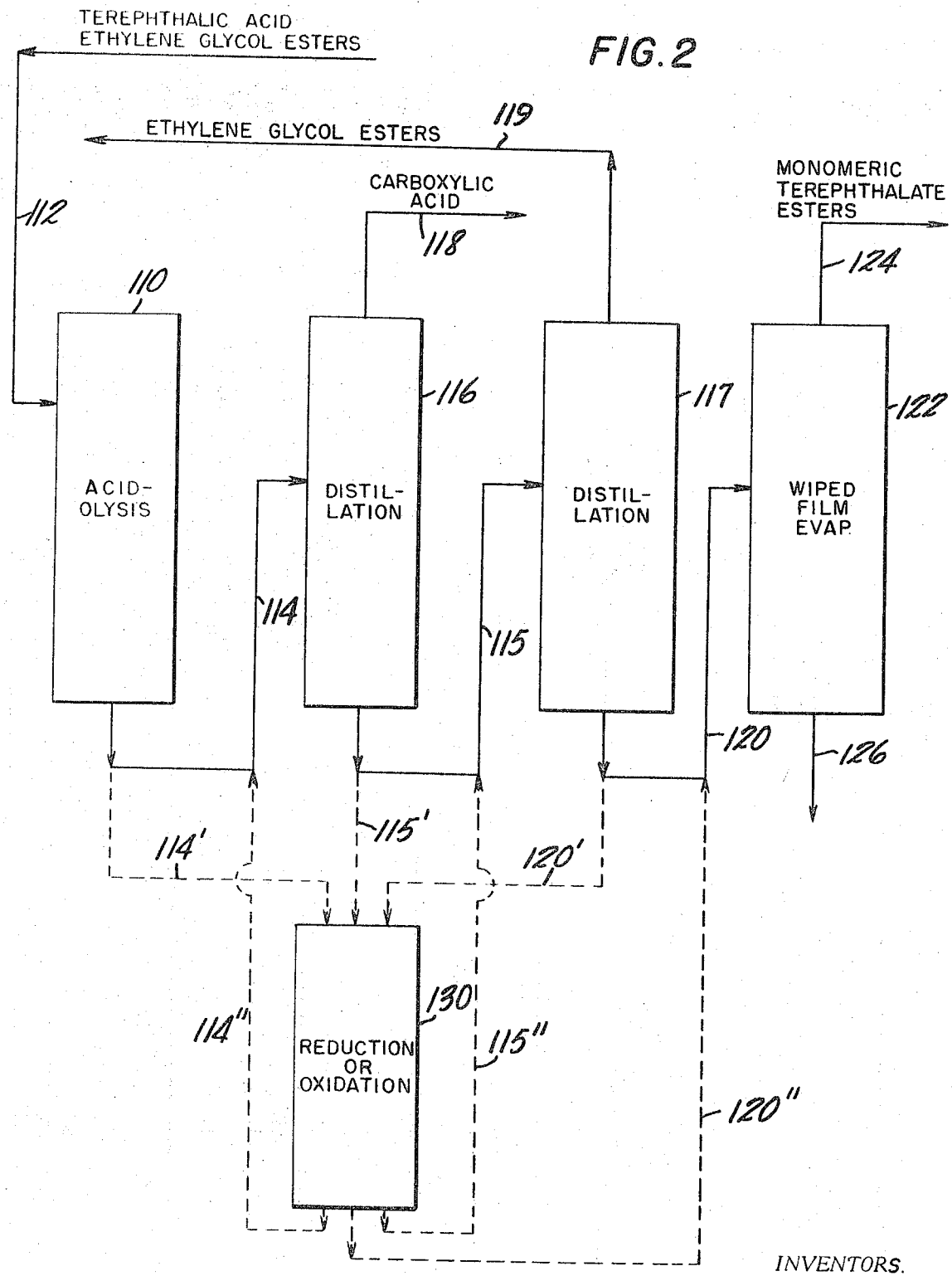

In order to provide a clearer understanding of the invention as it has been described above, and in order to facilitate the description of the embodiments of the invention, reference is made to the accompanying drawing wherein:

FIG. 1 is a schematic flow diagram of a system embodying the process of the present invention wherein a reducing environment is provided in the main reduction zone; and FIG. 2 is a similar flow diagram illustrating an embodiment of the process of the invention wherein the reaction product is subjected to oxidation or reduction after it has been removed from the acidolysis zone.

Referring to the drawing and more particularly to FIG. 1, an acidolysis zone 10 is fed through a line 12 with terephthalic acid and ethylene glycol carboxylate ester and a hydrogenation catalyst. Hydrogen under pressure enters through a line 11. A line 13 is provided for removal of excess hydrogen when operating with a continuous flow of hydrogen at the desired pressure, the hydrogen being bubbled through the reaction mixture to facilitate reaction.

From the acidolysis zone 10 the reaction product passes via a line 14 to a first vaporization or distillation zone which, as discussed above, may be a fractionating column or a series of simple distillation units, these possibilities being represented in the drawing by a set of two simple distillation columns 16 and 17 connected by a line 15. Vaporized materials such as acetic acid and unreacted ethylene glycol carboxylate esters, as well as any free glycol which may be present, are removed in these columns. Thus, carboxylic acid is recovered through a line 18 from column 16, and ethylene glycol esters and free glycol are removed through line 19 and may be recycled to acidolysis zone 10. The bottoms are removed through a line 20 and fed to a second vaporization zone which is exemplified by a wiped film evaporator 22. The distillate from the wiped film evaporator 22 is removed through line 24 for further processing, and the bottoms, which comprise oligomers, are removed through line 26. Any water is removed at 16 and 17.

The separations carried out in the preliminary vaporization zone, e.g. columns 16 and 17, and in the final vaporization zone, e.g. unit 22, are carried out under temperature and pressure conditions which are appropriate for the particular degree of separation desired, and the specific temperature and pressure values for particular separations can be readily determined in routine manner by persons skilled in the art. In general, however, the preliminary separation, such as is carried out in columns 16 and 17, which may actually be a separation not only in two stages as illustrated but in one stage or in more than two stages, is effected at temperatures of 100°C to 250°C and at pressures of 50 mm.Hg to 760 mm.Hg. In like manner, the separation in the final vaporization zone, e.g. the wiped film evaporator 22, is carried out at temperatures of 200°C to 300°C and at pressures of 1 to 100 mm.Hg. These are preferred operations. However, other temperatures and pressures can be used in these distillations, such as pressures down to 0.1 mm.Hg for example.

In general, it is desirable to separate most of the free carboxylic acid and the free ethylene glycol esters in the preliminary vaporization zone, e.g. at least 90 percent of these materials, which can readily be achieved because of the differences in the volatilities of the components of the reaction mixture, but such a degree of separation is in no way critical because these components can be later separated in the subsequent treatment of the reaction mixture to recover these components. Similarly, the differences in volatility between the monomeric products and the polymeric products, e.g. oligomers produced in the acidolysis reaction, are substantial so that the two classes of materials can be reasonably well separated in vaporization zone 22, especially if use is made of a wiped film evaporator. However, the degree of separation may vary but it is preferred to leave some of the monomeric materials in the polymeric residue and up to about 50 percent or even more, of the monomeric materials may be present with the polymeric components which accumulate in the residue. Alternatively, some of the polymeric components, e.g. low molecular weight oligomers such as dimers, may be volatized and removed overhead with the monomeric materials.

Referring to FIG. 2, wherein like parts have been given like reference numerals preceded by "1," it will be seen that a treatment (oxidation or reduction) zone 130 has been introduced into the system between the acidolysis zone and the wiped film evaporator 122.

The system illustrated in FIG. 2 is merely representative of those embodiments of the invention wherein the treatment of the acidolysis product with reducing and/or oxidizing agents is effected outside the acidolysis zone. In FIG. 2, the treatment zone 130 is shown as being disposed upstream of the final vaporization zone 122 and adapted to receive material directly from the acidolysis zone 110 before it is passed into the vaporization zone 116 (lines 114' and 114'') or after zone 116 but before zone 117 (lines 115' and 115'') or after zone 117 but before zone 122 (lines 120' and 120''). This arrangement is preferred when the acidolysis product is subjected to reduction, or to oxidation with oxidizing agents which leave a non-volatile residue. Such non-volatile materials, as well as hydrogenation catalysts, will accumulate in the residue from the vaporization zone 122 and can thus be removed from the terephthalate product stream. Indeed, it has been discovered that the hydrogenation catalysts such as nickel, palladium, and the like, which accumulate in the residue from vaporization effected in vaporization zone 122(22) can be re-introduced into the acidolysis zone, if reduction is being effected in accordance with the embodiment of FIG. 1, or into the treatment zone 130 if reduction is being effected outside the acidolysis zone. In the case of some reductive or oxidative treatments in accordance with the invention it may be desirable to effect the desired treatment upon the product recovered from the final vaporization zone, e.g. the overhead from film vaporizer 122, and this is advisable in the case of oxidative treatment with peracids, e.g. peracetic acid. For such operation, the treatment zone 130 shown in FIG. 2 would be transposed to a position downstream of vaporizing zone 122. It has been previously indicated that both an oxidative and a reductive treatment may be applied to the acidolysis product. This is especially advantageous when it is desired to produce polyester precursors having exceptionally high purity for making fiber-grade polyesters since each treatment in the series can be milder than if one or the other step were used for the entire lowering of 4-CBA content. When both oxidative and reductive treatments are applied, in a second treatment zone (not shown) corresponding to unit 130 in FIG. 2 is introduced into the system and in a preferred embodiment the oxidative treatment is effected prior to the final distillation in zone 122 as in the system illustrated in FIG. 2 and the reductive treatment is effected downstream of unit 122, i.e. upon the overhead product recovered from 122 in a second treatment zone (not shown). Alternatively, both the unit 130 and a second treatment zone may be disposed downstream of the overhead from distillation unit 122.

The invention will now be further described with particular reference to the following Examples of practical application, but it will be understood that these Examples are for illustrative purposes only and are not to be interpreted as limitative of the invention.

EXAMPLE I

A mixture of 64 g. crude terephthalic acid containing 0.19 percent by weight of 4-CBA, 280 g. of ethylene glycol diacetate, and 0.5 g. of 5 percent palladium on charcoal are charged through line 12 into acidolysis and reduction zone 10 which comprises a one-liter stainless steel autoclave fitted with a stirrer. The system is pressurized to 10 atmospheres with hydrogen introduced through line 11 and the temperature brought to 250°C. After 1.5 hours of reaction, the autoclave is cooled and the contents removed through line 14 and introduced into a single distillation unit defining distillation zones 16 and 17 and distilled at a pot temperature of about 210°C under a pressure of about 75 mm.Hg to remove volatile materials, leaving 118 g. of residual material. Analysis of the material shows a 4-CBA content of less than 15 ppm. The monomeric terephthalate product is separated from less volatile materials in wiped film evaporator 22 and 65 g. of product then recovered is hydrolyzed by treatment with 139 parts of water at 140°C for 360 minutes. This product is of fiber-grade quality, suitable for conversion to polyester for fiber and film formation.

EXAMPLE II

Example I is repeated except that 0.5 g. of Harshaw 0104P nickel (55 – 60 percent Ni on kieselguhr) is substituted for the palladium on charcoal. In a second experiment, Example I is again repeated except that 0.5 g. of 1 percent platinum on charcoal is substituted for the palladium catalyst. In both cases, the 4-CBA content of the treated product is less than 15 ppm.

EXAMPLE III

A. A mixture of 64 g. of the crude terephthalic acid containing 0.19 percent by weight of 4-CBA of Example I, and 280 g. of ethylene glycol diacetate is charged through line 112 to a one-liter stainless steel autoclave fitted with a stirrer and serving as acidolysis zone 110 and the autoclave is pressured with 200 psig of nitrogen. The reaction mixture is heated to 250°C and kept at that temperature with stirring for 1.5 hours, then cooled. The contents of acidolysis zone 110 are then passed through line 114 and distilled in flash distillation zone 116 at a pot temperature of about 200°C and at a pressure of about 760 mm.Hg to remove an overhead fraction composed primarily of acetic acid, and the bottom fraction from zone 116, substantially free of acetic acid, is passed through line 115 into still 117 where it is flash distilled at a pot temperature of 210°C and at a pressure of about 63 mm.Hg to remove an overhead fraction composed primarily of ethylene glycol esters. The residual material composed primarily of terephthalate esters in admixture with some polymeric material (about 10 percent) is then distilled in wiped film evaporator 122 at a pot temperature of about 260°C under pressure of about 5 mm.Hg to separate an overhead fraction representing about 90 percent of the charge and composed of terephthalate esters. These esters are then hydrolyzed by treatment with water at 140°C for 60 minutes to produce a hydrolyzed product suitable for conversion into polyesters but still containing almost all of the 4-CBA equivalents present in the original feed.

B. In the system of paragraph A, the reaction mixture as produced in zone 110 is first passed via line 114' into treatment zone 130 and has added to it 0.5 g. of 1 percent platinum on charcoal and the mixture is heated and stirred for one hour at 80°C in an atmosphere of hydrogen under a pressure of 30 psig. The product is analyzed and found to have a 4-CBA content of less than 15 ppm. The thus-treated material is then removed through line 114" and processed in accordance with the scheme described in paragraph A. The distilled material corresponding to the stream passing into wiped film evaporator 122 and the subsequently hydrolyzed product is found to be suitable for conversion into polyesters for fiber and film formation. The same result is observed when this procedure is repeated with (a) 0.5 g. of 5 percent palladium on charcoal and (b) with 0.5 g. 55–60 percent nickel on kieselguhr. The metal catalyst in each case is removed from the product in distillation zone 122 and can be recovered for re-use.

C. In the system of paragraph A, the reaction mixture as produced in zone 110 is first passed via line 114' into treatment zone 130 and has added to it 100 equivalents of chromic acid per equivalent of 4-CBA present and the mixture is heated and stirred for 1 hour at 120°C under sufficient pressure to keep the contents of zone 130 in the liquid phase. The product is analyzed and found to have a 4-CBA content of less than 15 ppm. The thus-treated material is then removed through line 114" and processed in accordance with the scheme described in paragraph A. The distilled material corresponding to the stream passing into wiped film evaporator 122 is subsequently hydrolyzed and the product is found to be suitable for conversion into polyesters for fiber and film formation. When potassium permanganate is substituted for the chromic acid, a product having a 4-CBA content of less than 15 ppm is also obtained.

D. In the system of paragraph A, the reaction mixture from zone 110, after distillation in units 116 and 117, is passed through line 120' into treatment zone 130 and 3 equivalents of peracetic acid, as a 15 percent solution in acetic acid, per equivalent of 4-CBA, are added to the mixture which is stirred at 100°C for 4 hours. Upon analysis before introduction into the wiped film evaporator 122, the treatment product is found to have a 4-CBA content of about 280 ppm and is suitable for subsequent conversion in the scheme of paragraph A into a precursor for polyesters of improved quality.

E. In the system of paragraph A, the distilled reaction mixture, as produced in distillation zone 117, is passed through line 120' into treatment zone 130 and 100 equivalents of sodium borohydride, as a 0.2 percent solution in isopropyl alcohol, per equivalent of 4-CBA, are added to the mixture which is stirred at 30°C for 4 hours. Upon analysis, before introduction into the wiped film evaporator 122, the treated product is found to have a 4-CBA content of less than 15 ppm and is suitable for subsequent conversion in the scheme of paragraph A into a precursor for polyesters for fiber and film formation.

Corresponding results are obtained when the distilled reaction mixture is similarly treated with lithium borohydride and with lithium aluminum tris-tertiary butoxy hydride (LiA(t-BuO)₃H), tertiary butyl alcohol being used as the solvent instead of isopropyl alcohol in the case of the last-named reducing agent.

The introduction of a solvent has the advantage having a fluidizing effect upon the material being treated with this facilitates treatment, and it is readily removed by distillation. Any excess reducing agent is readily destroyed in conventional manner, as by adding aqueous acetic acid.

F. In the system of paragraph A, the distilled reaction mixture as produced in zone 110 treated in distillation zones 116 and 117 is passed via line 120' into treatment zone 130 and has added to it three equivalents of performic acid as a 15 percent solution in acetic acid per equivalent of 4-CBA present and the mixture is heated and stirred at 60°C for 4 hours. The distilled material corresponding to the stream passing into wiped film evaporator 122 is analyzed and found to have a 4-CBA content of about 200 ppm and the subsequently hydrolyzed product is found to be suitable for conversion into polyesters of improved quality.

G. The procedure of paragraph F is repeated except that treatment is with 10 equivalents of a 50 percent hydrogen peroxide diluted with acetic acid to form a 3 percent solution in the acetic acid, per equivalent of 4-CBA, and the mixture is stirred at 60°C for 4 hours. Upon analysis before introduction into the wiped film evaporator 122, the treated product is found to have a 4-CBA content of about 350 ppm and is suitable for subsequent conversion in the scheme of paragraph A into a precursor for polyesters of improved quality.

H. The procedure of paragraph D is repeated except that following the treatment with peracetic acid and while the solvent is still present the product has added to it 0.5 g. of 5 percent palladium on charcoal and the mixture is heated and stirred for one hour at 80°C in a hydrogen atmosphere under a pressure of 50 psig. The distilled material corresponding to the stream passing into wiped film evaporator 122 is analyzed and found to have a 4-CBA content of less than 15 ppm and the subsequently hydrolzed product is found to be suitable for conversion into polyesters for fiber and film formation.

I. In the system of paragraph A, the reaction mixture as produced in zone 110 is first passed via line 114' into treatment zone 130 and has added to it 0.23 g. of cobalt diacetate tetrahydrate as catalyst and the mixture is heated and stirred for 1.5 hours at 150°C in an atmosphere of oxygen at 150 psig pressure. The thus-treated material is then removed through line 114" and processed in accordance with the scheme described in paragraph A. However, before further processing the material is analyzed and found to have a 4-CBA content of about 400 ppm.

EXAMPLE IV

When the experiments described in paragraphs B, C and I are repeated except that the material, i.e. the "substrate," treated in zone 130 is the mixture withdrawn from the system via line 115', i.e. following distillation in zone 116, or via line 120', i.e. following distillation in zone 117, substantially identical results are obtained with respect to 4-CBA values removed. In like manner, equivalent 4-CBA removal is achieved when the substrates used in the experiments of paragraphs F, G and H are those withdrawn through line 114' or through 115'. In the case of the experiments of paragraphs E, it is preferred to use a substrate essentially free of caroboxylic acid as described, but acceptable results are also obtained if the substrate from line 115' is used. In all cases, equivalent results from the standpoint of removal of 4-CBA values are realized when the reductive and oxidative treatments are applied to the terephthalate ester product following distillation in zone 122. In this case, however, it is sometimes necessary to effect a further distillation in order to remove catalysts or reagent residues, as described in Example V below.

EXAMPLE V

In this example the material treated is the overhead product from the wiped film evaporator 122 in the system of paragraph A, using as a feed to the acidolysis zone 110 526 parts by weight of terephthalic acid, 3,701 parts by weight of ethylene glycol diacetate and 659 parts by weight of ethylene glycol monoacetate. The overhead product recovered in line 124 from evaporator 122 contains 408 parts by weight of the diacetate of bis-(beta-hydroxyethyl) terephthalate and 176 parts by weight of the monoacetate of mono-(beta-hydroxyethyl) terephthalate along with a total of about 35 parts by weight of the original reactants, and has a 4-CBA content of about 35 parts ppm. In a treatment zone corresponding to zone 130, this mixture has added to it 3 equivalents/equiv. of 4-CBA of peracetic acid dissolved in acetic acid (15 percent solution) and treated as described in paragraph D. The thus-treated mixture is then transferred to a second reaction zone and has added to it 16 parts by weight of 55–60 percent nickel on kieselguhr 2,000 and is hydrogenated under the conditions described in paragraph B. During the course of the reactions described the peracetic acid is decomposed and the treated terephthalate mixture is then subjected to distillation in a second wiped film evaporator under the same conditions described in paragraph A. This effectively separates the terephthalates from the nickel catalyst and the thus recovered product, having a 4-CBA content of less than 15 ppm is a high quality precursor for polyesters to be used for fiber and film formation.

We claim:

1. A process of producing polyester precursors convertible into polyesters suitable for fiber and film formation which comprises (1) establishing a body of lower carboxylate esters of (beta-hydroxyethyl) terephthalate in admixture with components more volatile than said lower carboxylate esters and with components less volatile than said lower carboxylate esters, and containing deleterious amounts of color-producing impurities comprising 4-carboxy benzaldehyde and other compounds normally associated with terephthalic acid produced by catalytic oxidation and their lower carboxylate ester derivatives, (2) distilling said mixture to separate more volatile components therefrom and to leave a non-volatilized mixture comprising said lower carboxylate esters of (beta-hydroxyethyl) terephthalate, (3) distilling the non-volatilized mixture obtained from said first distillation to volatilize said lower carboxylate esters of (beta-hydroxyethyl) terephthalate away from less volatile materials, and thereby to produce a mixture comprising said lower carboxylate esters of (beta-hydroxyethyl) terephthalate, (4) reacting the mixture comprising said lower carboxylate esters of (beta-hydroxyethyl) terephthalate present in one of the preceding steps with at least one of an oxidizing agent effective to oxidize carbonyl groups and selected from the group consisting of molecular oxygen, peroxides, peracids, chromic acid, potassium permanganate, and nitric acid and a reducing agent effective to reduce carbonyl groups and selected from the group consisting of molecular hydrogen and alkali metal hydrides and borohydrides, and (5) hydrolyzing said carboxylate esters of (beta-hydroxyethyl) terephthalate after steps (3) and (4).

2. A process as defined in claim 1, wherein said lower carboxylate esters of (beta-hydroxyethyl) terephthalate are admixed with less volatile polymeric forms thereof and said esters are distilled away from said polymeric forms during step (3).

3. A process as defined in claim 1, wherein an oxidizing agent effective to oxidize carbonyl groups is employed in step 4.

4. A process as defined in claim 1, wherein a reducing agent effective to reduce carbonyl groups is employed in step 4.

5. A process as defined in claim 1, wherein said esters are reacted both with an oxidizing agent effective to oxidize carbonyl groups and with a reducing agent effective to reduce carbonyl groups.

6. A process defined in claim 2, wherein step (3) is carried out by wiped-film evaporation.

7. A process as defined in claim 1, wherein step (4) is applied to the mixture of step (1).

8. A process as defined in claim 1, wherein step (4) is applied to the non-volatilized mixture of step (2).

9. A process as defined in claim 1, wherein step (4) is applied to the mixture of step (1), employing molecular hydrogen as a reducing agent.

10. A process as defined in claim 1, wherein said esters are acetates.

11. A process as defined in claim 1, wherein said oxidizing agent is a peracid.

12. A process as defined in claim 1, wherein the reducing agent is molecular hydrogen.

* * * * *